(12) United States Patent
Inoue et al.

(10) Patent No.: US 6,847,772 B2
(45) Date of Patent: Jan. 25, 2005

(54) PLANAR OPTICAL WAVEGUIDE DEVICE

(75) Inventors: Tadao Inoue, Kawasaki (JP); Goji Nakagawa, Kawasaki (JP); Koji Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 113 days.

(21) Appl. No.: 10/273,995

(22) Filed: Oct. 21, 2002

(65) Prior Publication Data

US 2003/0152353 A1 Aug. 14, 2003

(30) Foreign Application Priority Data

Feb. 14, 2002 (JP) ........................................ 2002-036905

(51) Int. Cl.⁷ ................................................. G02B 6/10
(52) U.S. Cl. ...................................... 385/129; 385/131
(58) Field of Search .......................... 385/14, 129–132

(56) References Cited

U.S. PATENT DOCUMENTS

| | | | | |
|---|---|---|---|---|
| 4,851,025 | A | * | 7/1989 | Siefert et al. ................... 65/31 |
| 6,528,338 | B2 | * | 3/2003 | Bazylenko ................... 438/31 |
| 6,553,170 | B2 | * | 4/2003 | Zhong et al. ............... 385/130 |
| 6,704,487 | B2 | * | 3/2004 | Parhami et al. ............. 385/129 |
| 2003/0072548 | A1 | * | 4/2003 | Bhardwaj et al. ........... 385/129 |

FOREIGN PATENT DOCUMENTS

| JP | 63-033710 | 2/1988 |
|---|---|---|
| JP | 63-043105 | 2/1988 |
| JP | 63-071808 | 4/1988 |
| JP | 63-147114 | 6/1988 |
| JP | 63-147145 | 6/1988 |
| JP | 63-182608 | 7/1988 |
| JP | 64-077002 | 3/1989 |
| JP | 05-157920 | 5/1993 |
| JP | 05-288946 | 11/1993 |
| JP | 06-247733 | 9/1994 |
| JP | 07-281215 | 10/1995 |
| JP | 07-294763 | 11/1995 |
| JP | 08-136753 | 5/1996 |
| JP | 09-043558 | 2/1997 |
| JP | 09-120012 | 5/1997 |
| JP | 09-211240 | 8/1997 |
| JP | 10-048438 | 2/1998 |
| JP | 10-048460 | 2/1998 |
| JP | 10-105915 | 4/1998 |
| JP | 10-142439 | 5/1998 |
| JP | 11-095054 | 4/1999 |
| JP | 11-289296 | 10/1999 |
| JP | 11-326855 | 11/1999 |
| JP | 2000-075154 | 3/2000 |
| JP | 2000-162453 | 6/2000 |
| JP | 2000-241656 | 9/2000 |
| JP | 2001-042148 | 2/2001 |
| JP | 2001-051139 | 2/2001 |
| JP | 2001-051143 | 2/2001 |
| JP | 2001-051145 | 2/2001 |
| JP | 2001-066451 | 3/2001 |
| JP | 2001-091766 | 4/2001 |
| JP | 2001-194541 | 7/2001 |
| JP | 2001-194549 | 7/2001 |
| JP | 2001-221923 | 8/2001 |
| JP | 2001-255426 | 9/2001 |

* cited by examiner

*Primary Examiner*—Brian Healy
*Assistant Examiner*—Kevin S. Wood
(74) *Attorney, Agent, or Firm*—Staas & Halsey LLP

(57) ABSTRACT

A planar optical waveguide device including a substrate having a first coefficient of thermal expansion; a lower cladding layer formed on the substrate, the lower cladding layer having a second coefficient of thermal expansion smaller than the first coefficient of thermal expansion; a core formed on the lower cladding layer; an upper cladding layer formed on the lower cladding layer so as to cover the core, the upper cladding layer having the second coefficient of thermal expansion; and a plurality of grooves formed in the upper and lower cladding layers on the opposite sides of the core so as to extend along the core. The planar optical waveguide device further includes a contraction material filling each groove and fixed to the upper and lower cladding layers. The contraction material may be provided by a thermosetting resin.

16 Claims, 10 Drawing Sheets

PLANAR OPTICAL WAVEGUIDE DEVICE

BACKGROUND OF THE INVENTION

1. Field of the Invention

The present invention relates to a planar optical waveguide device having a function of light splitting, wavelength division multiplexing/demultiplexing, level control, or switching for use in the optical communication field or the like.

2. Description of the Related Art

A planar optical waveguide is composed of a substrate, a lower cladding layer formed on the substrate, a core formed on the lower cladding layer, and an upper cladding layer formed on the lower cladding layer so as to cover the core. The core has a refractive index higher than that of each of the upper and lower cladding layers, and light is confined in the core to propagate therein. In fabricating the planar optical waveguide, the process temperature for formation of each cladding layer and a core layer is in the range of 300° C. (CVD) to 1600° C. (flame hydrolysis deposition). Thus, the difference between the process temperature and room temperature is very large.

In general, the substrate is formed of silicon(Si) or silica, each cladding layer is formed of silica glass doped with phosphorus (P) or silica glass doped with boron (B) and phosphorus (P), for example, and the core is formed of silica glass doped with germanium (Ge) and phosphorus (P), for example. Since the material of the substrate is different from that of each cladding layer, the coefficient of thermal expansion of the substrate is also different from that of each cladding layer. Accordingly, when the fabrication process for the planar optical waveguide is finished to cool it near to room temperature, stress due to the difference in coefficient of thermal expansion between the substrate and each cladding layer is generated in each cladding layer.

For example, in the case that the substrate is formed of silicon and each cladding layer is formed of silica glass doped with phosphorus (P), compressive stress is generated in each cladding layer because the coefficient of thermal expansion of the Si substrate is larger than that of each cladding layer. Conversely, in the case that the substrate is formed of silica and each cladding layer is formed of silica glass doped with phosphorus (P), tensile stress is generated in each cladding layer because the coefficient of thermal expansion of the silica substrate is smaller than that of each cladding layer.

When stress is generated in each cladding layer of the optical waveguide, the birefringence of the core is caused by this stress. That is, the refractive index of the core becomes different according to the polarization direction of light propagating in the core. As a result, the propagation constant and guide wavelength of the optical waveguide becomes different according to the polarization direction. When a normal single-mode optical fiber is connected to such an optical waveguide device for use, the fundamental characteristics of the optical device such as insertion loss vary according to the polarization direction because the polarization direction in the optical fiber is not constant.

Such a loss dependent on the polarization direction is referred to as polarization-dependent loss (PDL). In a WDM optical communication system using a normal single-mode optical fiber, it is strongly demanded to reduce the PDL. A technique of forming stress relief grooves for relieving the stress generated in each cladding layer on the opposite sides of the core so as to extend along the core is disclosed in Japanese Patent Laid-open No. Sho 63-43105. Although the stress generated in each cladding layer can be relieved by the stress relief grooves, there are many limits to the composition and dimensions of each cladding layer, and it is difficult for the stress relief grooves to completely cancel the compressive stress applied to the core.

Thus, in the optical waveguide having the stress relief grooves described in the above publication, it is difficult to completely relieve the stress applied to the core. As a result, the birefringence due to the stress in each cladding layer is left in the core to cause an increase in polarization dependence of the optical waveguide, so that the polarization-dependent loss (PDL) is generated to cause the insertion loss of the device. In a conventional optical waveguide device whose core has the birefringence due to the stress, the output level changes with a change in polarization direction of incident light, so that this optical waveguide device cannot be applied to an optical communication system using a normal single-mode optical fiber.

SUMMARY OF THE INVENTION

It is therefore an object of the present invention to provide a planar optical waveguide device which can reduce the stress applied to the core of the optical waveguide to thereby reduce the polarization dependence of the optical waveguide.

In accordance with an aspect of the present invention, there is provided a planar optical waveguide device including a substrate having a first coefficient of thermal expansion; a lower cladding layer formed on the substrate, the lower cladding layer having a second coefficient of thermal expansion smaller than the first coefficient of thermal expansion; a core formed on the lower cladding layer; an upper cladding layer formed on the lower cladding layer so as to cover the core, the upper cladding layer having the second coefficient of thermal expansion; a plurality of grooves formed in the upper and lower cladding layers on the opposite sides of the core so as to extend along the core; and a contraction material filling each of the plurality of grooves and fixed to the upper and lower cladding layers.

Preferably, the contraction material includes a thermosetting resin or a UV setting resin. For example, the substrate is formed of silicon, and the upper and lower cladding layers are formed of phosphorus-doped silica glass. A temperature controller such as a heater or Peltier element may be mounted on the contraction material filling each groove, so as to control the amount of contraction of the contraction material.

In accordance with another aspect of the present invention, there is provided a planar optical waveguide device including a substrate having a first coefficient of thermal expansion; a lower cladding layer formed on the substrate, the lower cladding layer having a second coefficient of thermal expansion smaller than the first coefficient of thermal expansion; a core formed on the lower cladding layer; a plurality of dummy cores formed on the lower cladding layer on the opposite sides of the core; an upper cladding layer formed on the lower cladding layer so as to cover the core and the dummy cores, the upper cladding layer having the second coefficient of thermal expansion, the upper cladding layer having a plurality of projections respectively corresponding to the core and the dummy cores; and a contraction material fixed to the upper cladding layer so as to cover a part of the projections corresponding to the dummy cores on each side of the core.

In accordance with a further aspect of the present invention, there is provided a planar optical waveguide device including a substrate having a first coefficient of thermal expansion; a lower cladding layer formed on the substrate, the lower cladding layer having a second coefficient of thermal expansion smaller than the first coefficient of thermal expansion; a core formed on the lower cladding layer; an upper cladding layer formed on the lower cladding layer so as to cover the core, the upper cladding layer having the second coefficient of thermal expansion; a plurality of grooves formed in the upper and lower cladding layers on the opposite sides of the core so as to extend along the core; a piezoelectric material filling each of the plurality of grooves and fixed to the upper and lower cladding layers; and means for applying a voltage to the piezoelectric material.

In accordance with a still further aspect of the present invention, there is provided a planar optical waveguide device including a substrate having a first coefficient of thermal expansion; a lower cladding layer formed on the substrate, the lower cladding layer having a second coefficient of thermal expansion larger than the first coefficient of thermal expansion; a core formed on the lower cladding layer; an upper cladding layer formed on the lower cladding layer so as to cover the core, the upper cladding layer having the second coefficient of thermal expansion; a plurality of grooves formed in the upper and lower cladding layers on the opposite sides of the core so as to extend along the core; a thermal expansion material filling each of the plurality of grooves; and a temperature controller mounted on the thermal expansion material.

In accordance with a still further aspect of the present invention, there is provided a planar optical waveguide device including a substrate having a first coefficient of thermal expansion; a lower cladding layer formed on the substrate, the lower cladding layer having a second coefficient of thermal expansion larger than the first coefficient of thermal expansion; a core formed on the lower cladding layer; an upper cladding layer formed on the lower cladding layer so as to cover the core, the upper cladding layer having the second coefficient of thermal expansion; a plurality of grooves formed in the upper and lower cladding layers on the opposite sides of the core so as to extend along the core; a piezoelectric material filling each of the plurality of grooves; and means for applying a voltage to the piezoelectric material.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
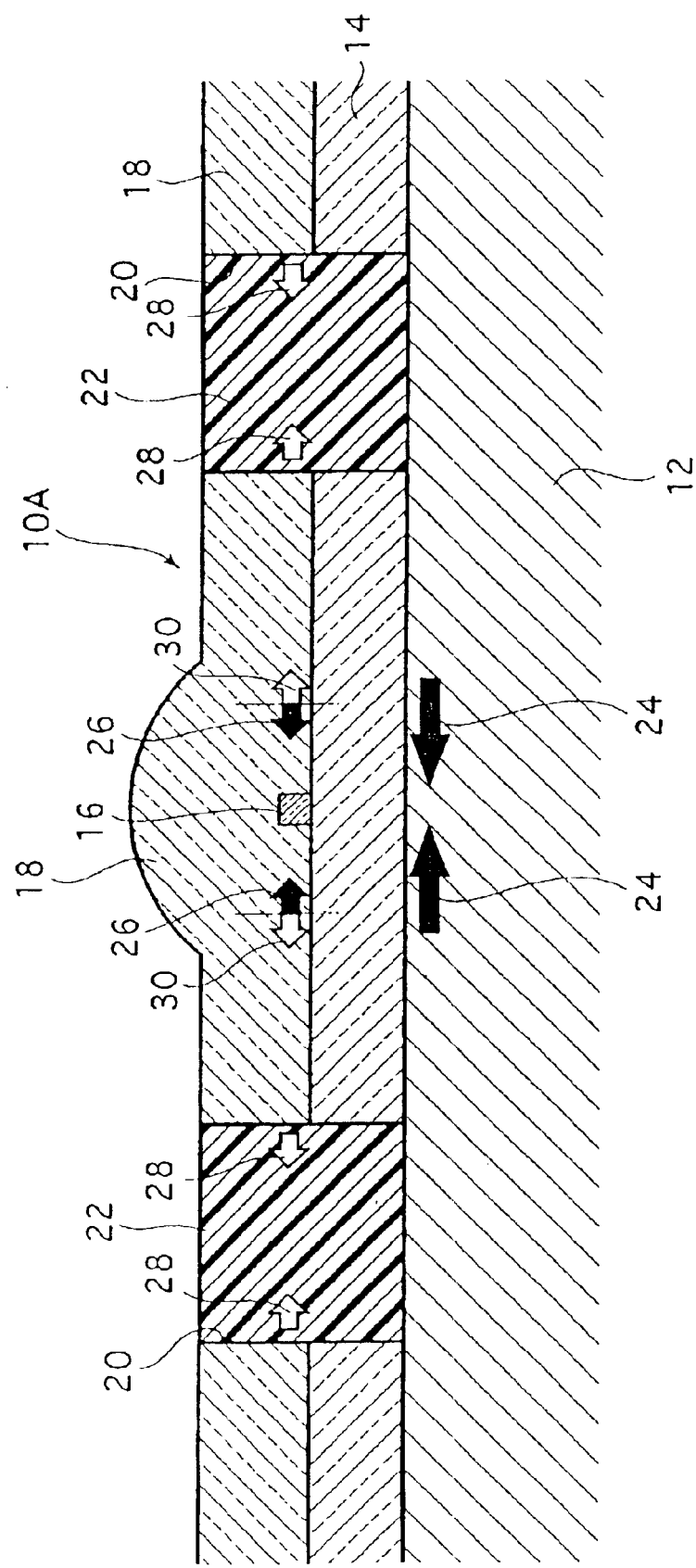
FIG. 1 is a sectional view of a planar optical waveguide device according to a first preferred embodiment of the present invention.

Referring to FIG. 1, there is shown a sectional view of a planar optical waveguide device 10A according to a first preferred embodiment of the present invention. The planar optical waveguide device 10A is fabricated in the following manner. A lower cladding layer 14 having a thickness of 20 $\mu$m is deposited on an Si substrate 12 by atmospheric-pressure CVD using tetraethyl orthosilicate (tetraethoxysilane: TEOS), trimethyl phosphate (TMPO), and ozone ($O_3$) as reactant gases. Thereafter, a core layer having a thickness of 7 $\mu$m is deposited on the lower cladding layer 14 by atmospheric-pressure CVD using TEOS, tetramethoxygermane (TMG), TMPO, and ozone as reactant gases. Thereafter, the core layer is partially removed by photolithography and etching to obtain a core 16 having a width of 7 $\mu$m. Thereafter, an upper cladding layer 18 having a thickness of 20 $\mu$m is deposited on the lower cladding layer 14 so as to cover the core 16 by atmospheric-pressure CVD using the same reactant gases as those for deposition of the lower cladding layer 14.

Accordingly, both the lower cladding layer 14 and the upper cladding layer 18 are formed of phosphorus (P)-doped silica glass (which will be hereinafter referred to as PSG), and the core 16 is formed of germanium (Ge)— and phosphorus (P)-doped silica glass (which will be hereinafter referred to as GPSG). The atmospheric-pressure CVD may be replaced by plasma-enhanced CVD or flame hydrolysis deposition (FHD) for deposition of the lower cladding layer 14, the core layer, and the upper cladding layer 18.

Thereafter, a plurality of grooves 20 each having a width of 30 $\mu$m and a depth of 40 $\mu$m are formed in the cladding layers 14 and 18 on the opposite sides of the core 16 so as to be spaced a distance of 30 $\mu$m from the core 16 by photolithography and etching. Each groove 20 may extend along the core 16 over the length thereof or along a part of the core 16 according to the degree of reduction in polarization dependence. Each groove 20 is filled with a thermosetting resin 22 such as epoxy adhesive as the contraction material. The thermosetting resin 22 is cured by heating at 150° C. for one minute, for example. As a result, the thermosetting resin 22 is contracted to thereby apply tensile stresses 28 to the side surfaces of the cladding layers 14 and 18 to which the thermosetting resin 22 is bonded. Examples of the epoxy adhesive usable as the thermosetting resin 22 include EPO-TEK 353ND manufactured by Epoxy Technology Inc. and STYCAST 1206 manufactured by Ablestik (Japan) Co., Ltd.

The coefficient of thermal expansion of the Si substrate 12 is $35 \times 10^{-7}$/K, and the coefficient of thermal expansion of the PSG forming the cladding layers 14 and 18 is $20 \times 10^{-7}$/K. Accordingly, when the device is cooled from about 400° C. as a process temperature for atmospheric-pressure CVD to room temperature, compressive stresses 24 are applied to the interface between the Si substrate 12 and the lower cladding layer 14. As a result, compressive stresses 26 are applied to the core 16. However, the compressive stresses 26 are canceled or relaxed by tensile stresses 30 generated in the cladding layers 14 and 18 due to the contraction of the thermosetting resin 22 cured.

In the case that the coefficient of thermal expansion of the Si substrate 12 is larger than the coefficient of thermal expansion of each of the cladding layers 14 and 18 as described above, the compressive stresses 24 are generated in the cladding layers 14 and 18 by cooling from the film deposition temperature to room temperature. On the other hand, the thermosetting resin 22 such as epoxy adhesive filling each groove 20 is heated to a given temperature for curing, thereby contracting the thermosetting resin 22 at a rate of about 5%, for example. As a result, the tensile stresses 28 and 30 are generated in the cladding layers 14 and 18 to thereby cancel or relax the compressive stresses 26 applied to the core 16 according to the difference in coefficient of thermal expansion between the substrate 12 and each of the cladding layers 14 and 18.

According to this preferred embodiment, the compressive stresses applied to the core 16 of the optical waveguide can be reduced to thereby reduce the polarization dependence of the planar optical waveguide device 10A and contribute to the improvement in performance of the planar optical waveguide device 10A. While the thermosetting resin 22 is used as the contraction material filling each groove 20 in this preferred embodiment, each groove 20 may be filled with a UV setting resin. In this case, the UV setting resin is cured by irradiation with ultraviolet light. Also in this case, a similar effect can be obtained.

As the UV setting resin, an epoxy UV setting resin such as World Rock X8720 manufactured by Kyoritsu Chemical Co., Ltd. may be used. In the case of World Rock X8720, the time required for curing the UV setting resin is about 30 seconds. While PSG is used as the material of each of the cladding layers 14 and 18 in this preferred embodiment, boron (B)— and phosphorus (P)-doped silica glass (BPSG) may be used instead of PSG.

Figure 2:
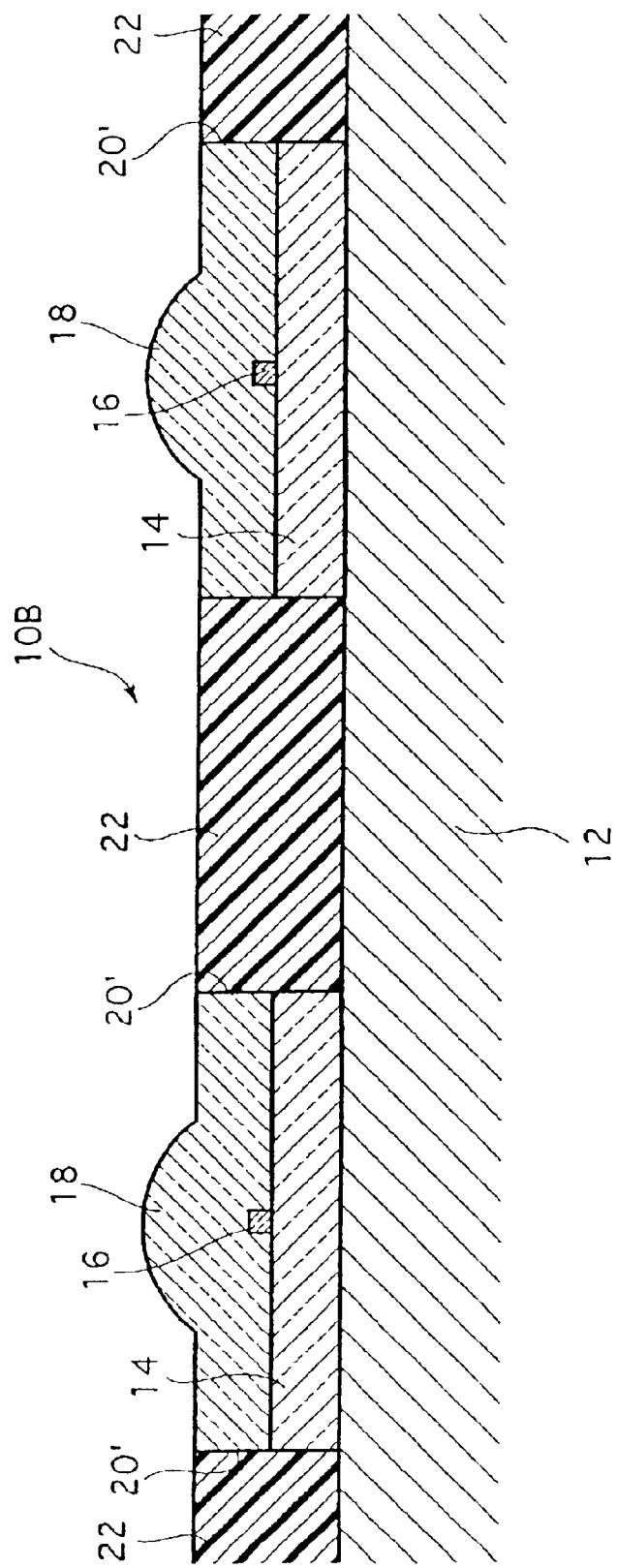
FIG. 2 is a sectional view of a planar optical waveguide device according to a second preferred embodiment of the present invention.

Referring to FIG. 2, there is shown a sectional view of a planar optical waveguide device 10B according to a second preferred embodiment of the present invention. In contrast to the first preferred embodiment shown in FIG. 1, the second preferred embodiment is characterized in that a plurality of grooves 20' wider than the grooves 20 are formed. For example, the waveguide spacing (core spacing) is 250 μm, the core width is 7 μm, the distance from each core 16 to the side wall of each of the adjacent grooves 20' formed on the opposite sides of the core 16 is 30 μm, and the width of each groove 20' is 183 μm.

The other configuration of this preferred embodiment is similar to that of the first preferred embodiment. As the width of each groove 20' is large, the amount of contraction of the contraction material 22 such as thermosetting resin or UV setting resin filling each groove 20' becomes large, so that tensile stresses larger than those in the first preferred embodiment can be generated in the cladding layers 14 and 18. Accordingly, it is possible to cancel larger compressive stresses generated in the cladding layers 14 and 18 according to the difference in coefficient of thermal expansion between the substrate 12 and each of the cladding layers 14 and 18.

Figure 3:
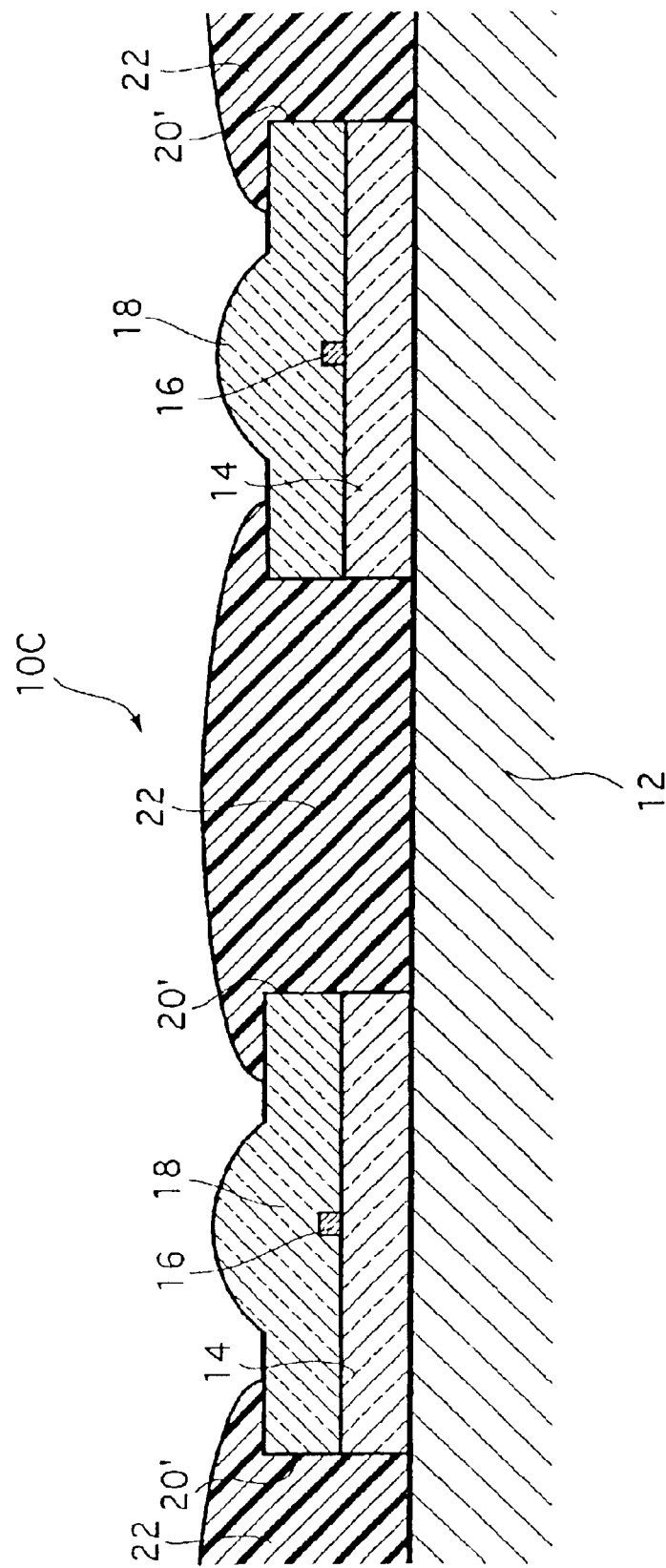
FIG. 3 is a sectional view of a planar optical waveguide device according to a third preferred embodiment of the present invention.

FIG. 3 shows a sectional view of a planar optical waveguide device 10C according to a third preferred embodiment of the present invention. This preferred embodiment is similar to the second preferred embodiment shown in FIG. 2 except that the contraction material 22 is applied not only to fill each groove 20', but also to cover the outer periphery of each groove 20', in order to increase the bonding area of the contraction material 22 such as thermosetting resin or UV setting resin to the cladding layers 14 and 18. That is, the contraction material 22 is bonded not only to the side surfaces of the cladding layers 14 and 18, but also to the upper surface of the cladding layer 18. Accordingly, tensile stresses larger than those in the second preferred embodiment can be applied to the cladding layers 14 and 18.

Figure 4:
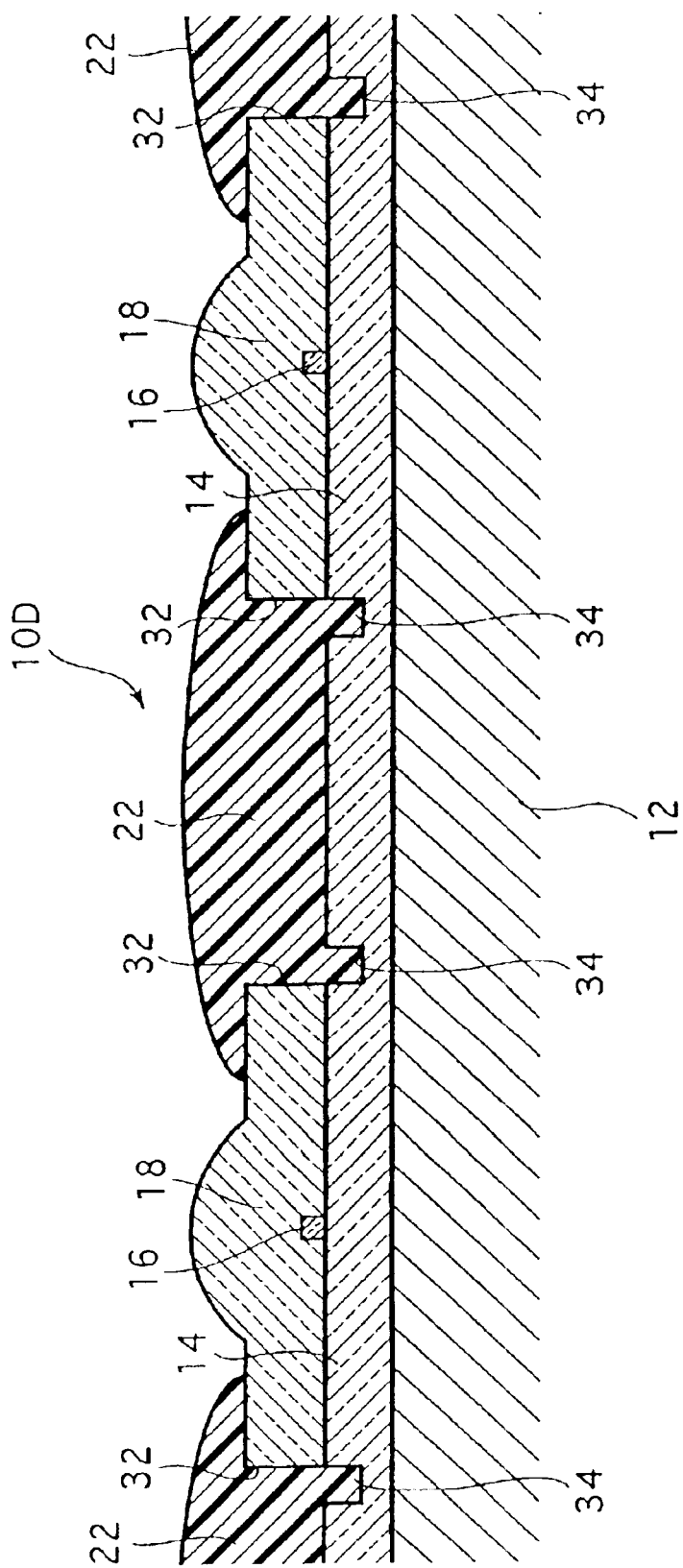
FIG. 4 is a sectional view of a planar optical waveguide device according to a fourth preferred embodiment of the present invention.

FIG. 4 shows a sectional view of a planar optical waveguide device 10D according to a fourth preferred embodiment of the present invention. In this preferred embodiment, a plurality of grooves 32 are formed in the upper cladding layer 18 over the thickness thereof and a pair of second grooves (recesses) 34 are formed inside each groove 32 so as to project into the lower cladding layer 14, in order to more extensively transmit the contraction forces of the contraction material 22 such as thermosetting resin or UV setting resin to the cladding layers 14 and 18. With this configuration, the bonding area of the contraction material 22 to the cladding layers 14 and 18 can be more increased, thereby canceling or relaxing larger compressive stresses generated in the cladding layers 14 and 18 according to the difference in coefficient of thermal expansion between the substrate 12 and each of the cladding layers 14 and 18.

Each groove 32 may be formed by photolithography and etching after deposition of the upper cladding layer 18, and the second grooves 34 in each groove 32 may be next formed by photolithography and etching. After thus forming each groove 32 and the second grooves 34 in each groove 32, the contraction material 22 is filled into each groove 32 and the second grooves 34, and next cured to be bonded to the cladding layers 14 and 18. For example, each groove 32 has a width of 183 μm and a depth of 20 μm, and each second groove 34 has a width of 10 μm and a depth of 10 μm.

Figure 5:
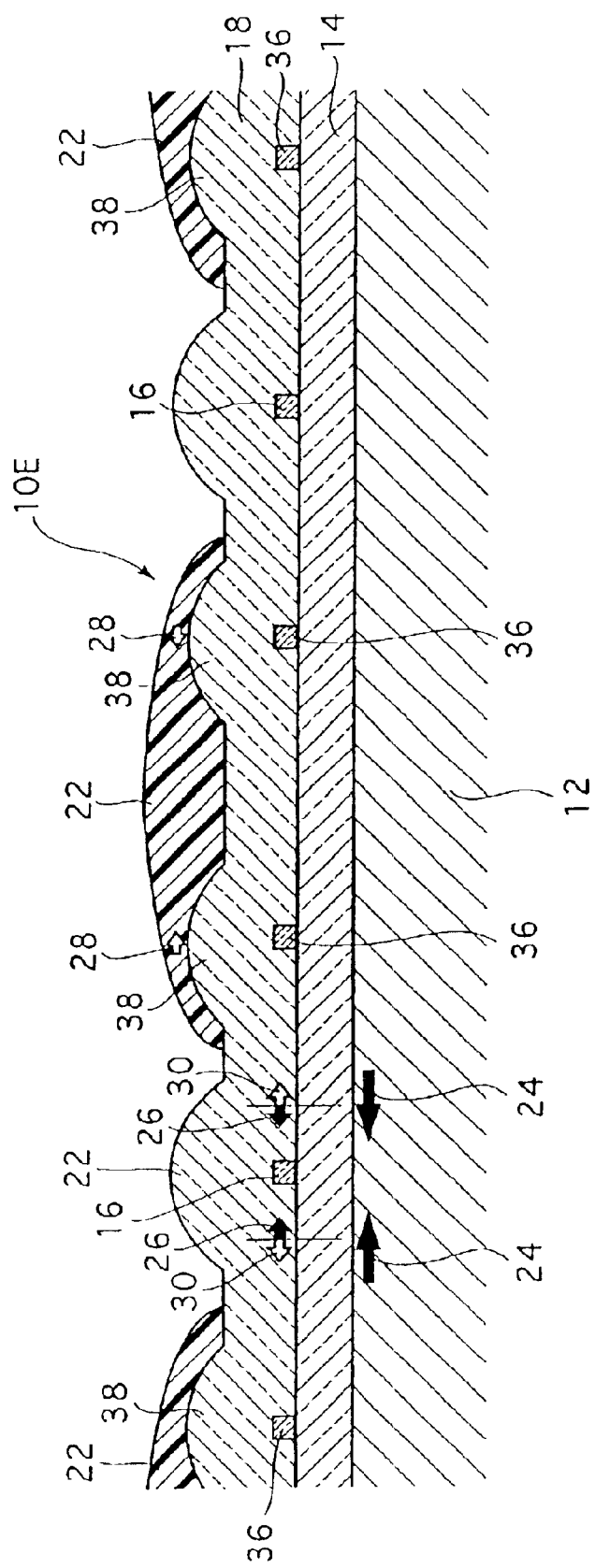
FIG. 5 is a sectional view of a planar optical waveguide device according to a fifth preferred embodiment of the present invention.

Referring to FIG. 5, there is shown a sectional view of a planar optical waveguide device 10E according to a fifth preferred embodiment of the present invention. In this preferred embodiment, a plurality of dummy cores 36 are formed on the opposite sides of each core 16 as an optical waveguide. The upper cladding layer 18 having a given thickness is deposited on the lower cladding layer 14 so as to cover each core 16 and each dummy core 36. As a result, a plurality of projections 38 of the upper cladding layer 18 are formed at positions respectively corresponding to the dummy cores 36. The contraction material 22 such as thermosetting resin or UV setting resin is applied to the upper cladding layer 18 so as to cover the projections 38. By curing the contraction material 22, it is contracted as shown by arrows 28 to thereby generate the tensile stresses 30 in the cladding layers 14 and 18.

Since the plural projections 38 are formed, the bonding area between the contraction material 22 and the upper cladding layer 18 can be increased to thereby increase the tensile stresses 30 generated in the cladding layers 14 and 18. The dummy cores 36 are formed by photolithography and etching in the same process for forming the cores 16. There is an upper limit to the temperature for annealing the upper cladding layer 18 for the purpose of improving the film quality. That is, the upper cladding layer 18 is preferably annealed at a temperature such that the projections 38 formed above the dummy cores 36 are not fluidized and flattened. For example, in the case that the cladding layers 14 and 18 are formed of PSG, the annealing temperature is preferably set to about 1000° C.

Figure 6:
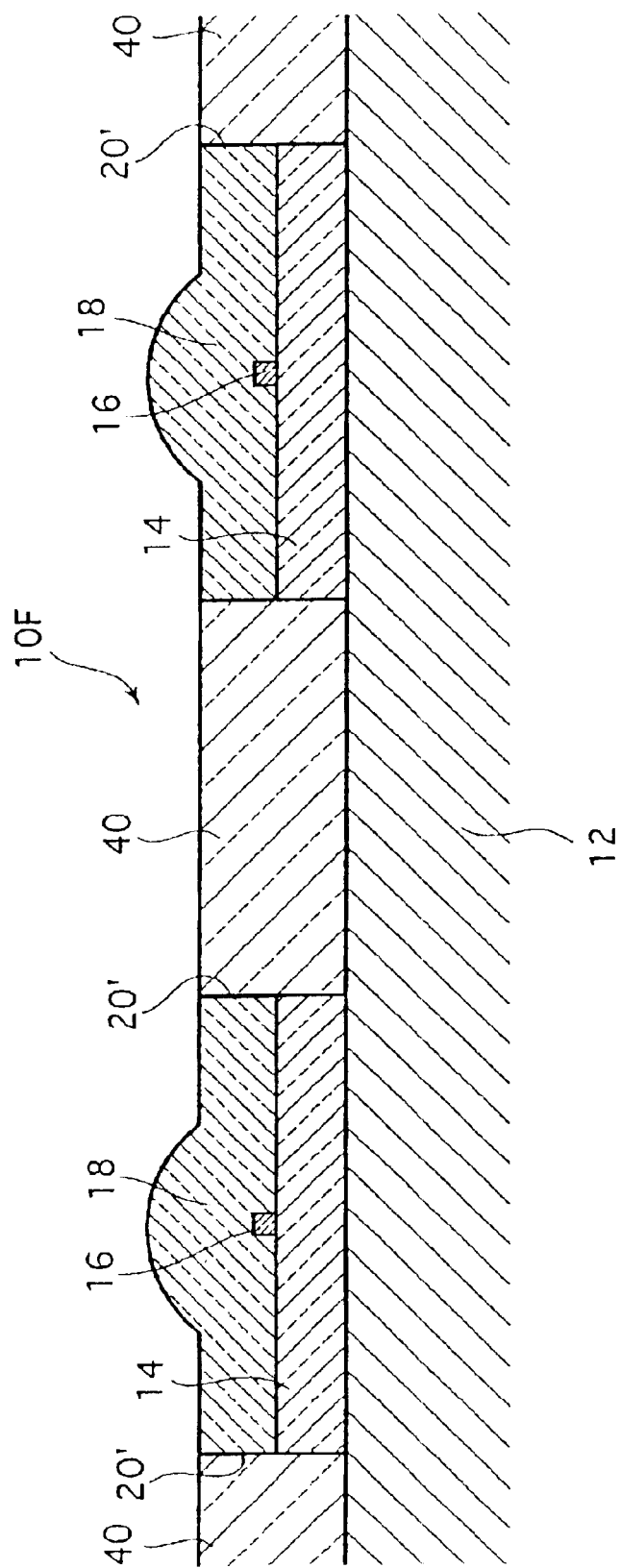
FIG. 6 is a sectional view of a planar optical waveguide device according to a sixth preferred embodiment of the present invention.

FIG. 6 shows a sectional view of a planar optical waveguide device 10F according to a sixth preferred embodiment of the present invention. In this preferred embodiment, each groove 20' is filled with boron (B)— and phosphorus (P)-doped silica glass (BPSG) 40 as the contraction material having a coefficient of thermal expansion larger than the coefficient of thermal expansion of PSG forming the cladding layers 14 and 18. The filling of each groove 20' with the BPSG 40 may be performed by uniformly forming a BPSG layer by CVD after formation of each groove 20' and next removing an unwanted portion of the BPSG layer by photolithography and etching.

Since the coefficient of thermal expansion of the BPSG 40 filling each groove 20' is larger than that of each of the cladding layers 14 and 18, tensile stresses can be generated in the cladding layers 14 and 18 to thereby cancel or reduce the compressive stresses generated in the cladding layers 14 and 18 according to the difference in coefficient of thermal expansion between the substrate 12 and each of the cladding layers 14 and 18. Accordingly, the polarization dependence of the planar optical waveguide device 10F can be eliminated or reduced.

Figure 7:
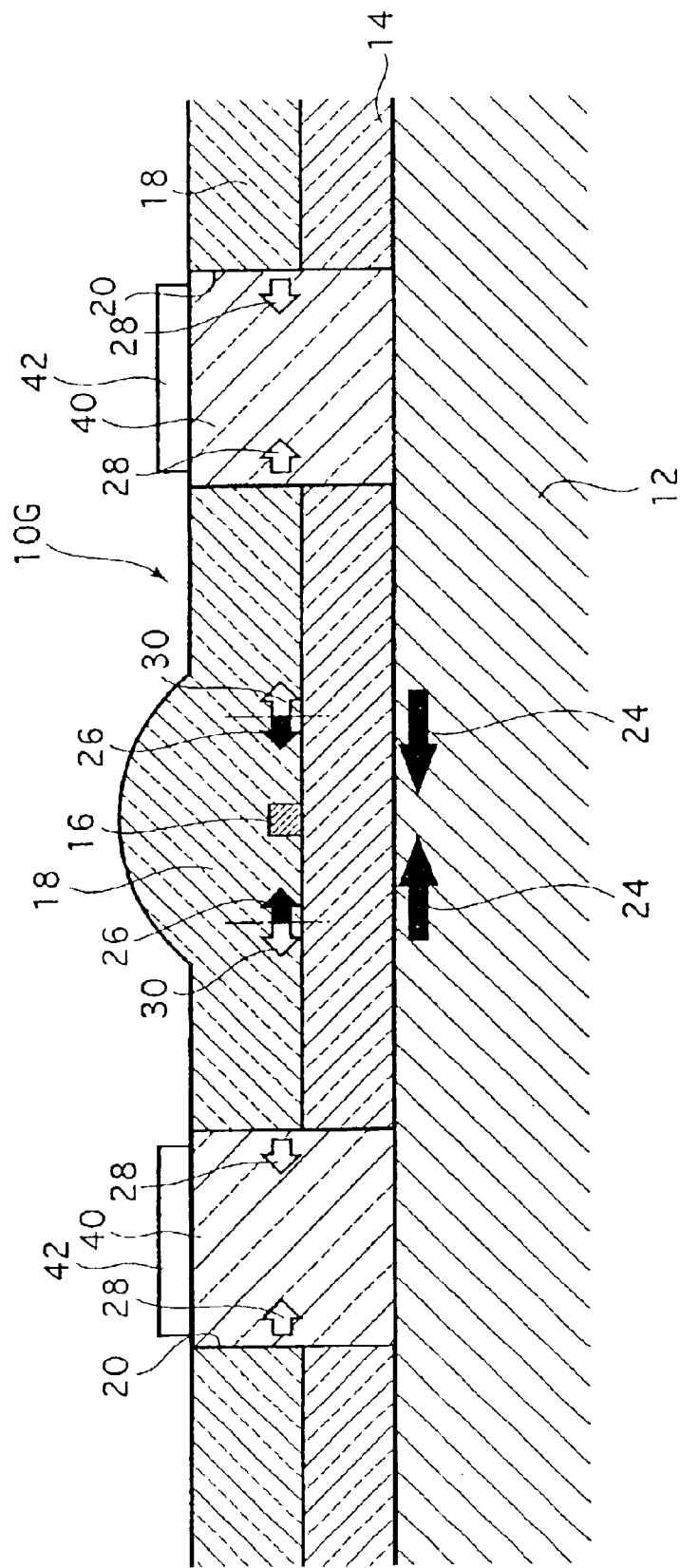
FIG. 7 is a sectional view of a planar optical waveguide device according to a seventh preferred embodiment of the present invention.

Referring to FIG. 7, there is shown a sectional view of a planar optical waveguide device 10G according to a seventh preferred embodiment of the present invention. In this preferred embodiment, each groove 20 is filled with BPSG 40 as the contraction material, and a temperature controller 42 such as a heater or Peltier element is mounted on the upper surface of each BPSG 40. In the case of adopting a heater as the temperature controller 42, a Cr film having a thickness of about 200 nm, for example, is deposited on each BPSG 40 by evaporation. By passing a current through each heater 42 to change the temperature of the BPSG 40 provided under the heater 42, the BPSG 40 can be thermally expanded or contracted to thereby completely cancel the compressive stresses generated in the cladding layers 14 and 18 according to the difference in coefficient of thermal expansion between the Si substrate 12 and each of the cladding layers 14 and 18.

Preferably, the tensile stresses 30 generated in the cladding layers 14 and 18 by the contraction forces 28 in each BPSG 40 are preliminarily set larger than the compressive stresses 26 applied to each core 16, and by controlling the current passing through the heater 42 to expand the BPSG 40 the tensile stresses 30 are controlled to balance the compressive stresses 26. In the case of using a Peltier element as the temperature controller 42, each BPSG 40 as the contraction material can be freely expanded or contracted to thereby completely cancel the compressive stresses 26 applied to each core 16. Thus, the polarization dependence of the planar optical waveguide device 10G can be eliminated.

Figure 8:
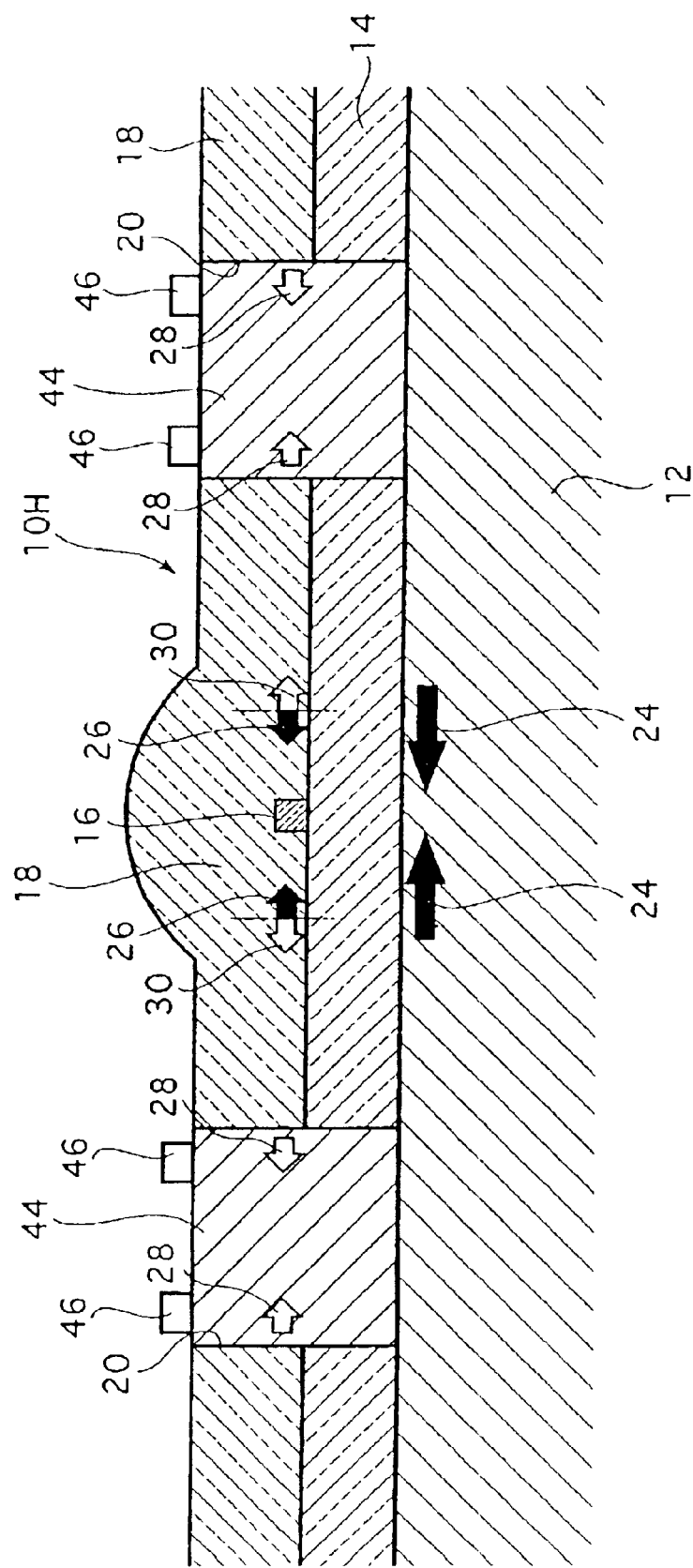
FIG. 8 is a sectional view of a planar optical waveguide device according to an eighth preferred embodiment of the present invention.

FIG. 8 shows a sectional view of a planar optical waveguide device 10H according to an eighth preferred embodiment of the present invention. In this preferred embodiment, each groove 20 is filled with a piezoelectric material 44 such as ZnO, and this material 44 is bonded to the side surfaces of the cladding layers 14 and 18. A pair of electrodes 46 are mounted on the upper surface of each piezoelectric material 44. By applying a given voltage in a given direction between these electrodes 46, each piezoelectric material 44 is contracted as shown by arrows 28 to thereby generate the tensile stresses 30 in the cladding layers 14 and 18. Accordingly, the compressive stresses 26 generated in the cladding layers 14 and 18 according to the difference in coefficient of thermal expansion between the Si substrate 12 and each of the cladding layers 14 and 18 can be canceled by the tensile stresses 30.

The filling of each groove 20 with the piezoelectric material 44 may be performed by the combination of lift-off and sputtering. Each electrode 46 may be provided by a gold electrode formed by evaporation, for example. In the first to eighth preferred embodiments mentioned above, compressive stresses are generated in the cladding layers 14 and 18 because the coefficient of thermal expansion of the Si substrate 12 is larger than that of each of the cladding layers 14 and 18.

Figure 9:
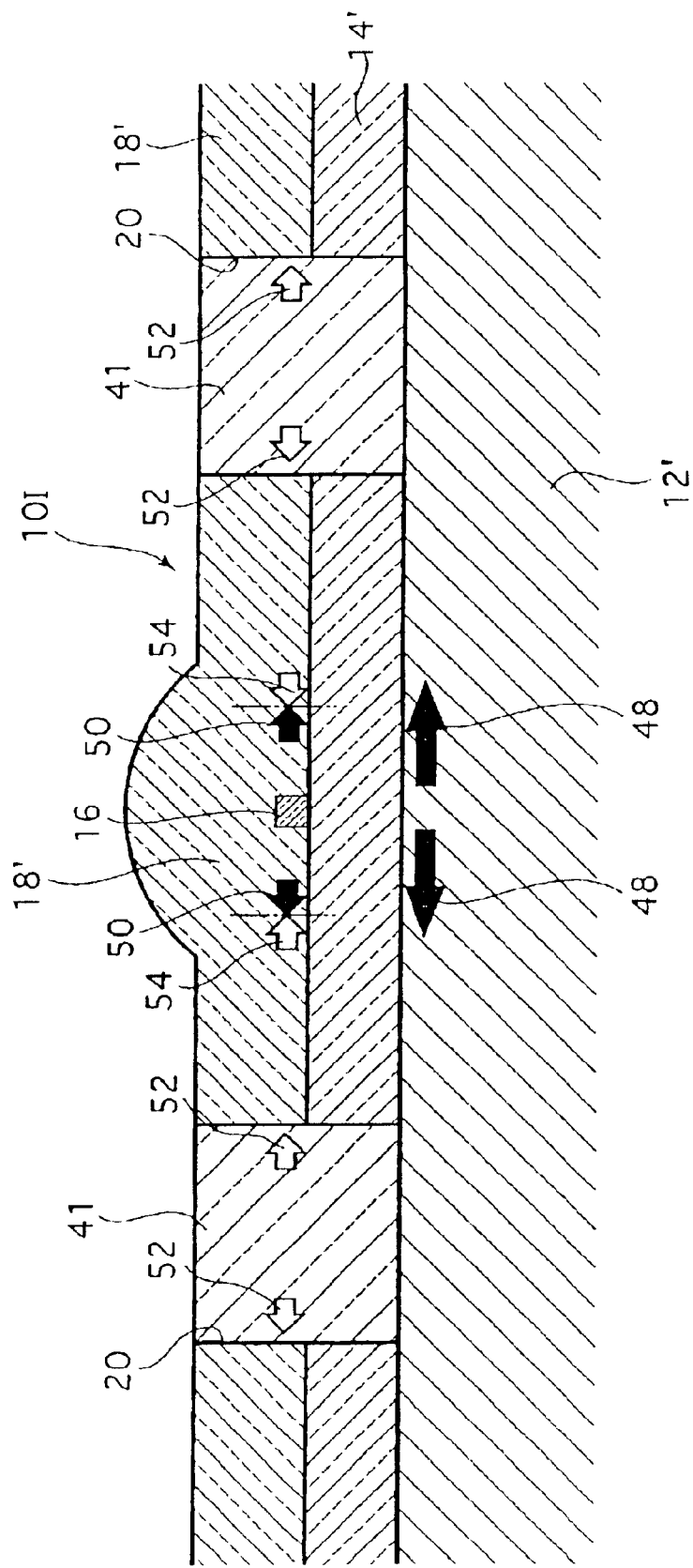
FIG. 9 is a sectional view of a planar optical waveguide device according to a ninth preferred embodiment of the present invention.

FIG. 9 shows a sectional view of a planar optical waveguide device 10I according to a ninth preferred embodiment of the present invention. In contrast to the previous preferred embodiments, this preferred embodiment employs a silica substrate 12' having a relatively small coefficient of thermal expansion as the substrate and employs a lower cladding layer 14' and an upper cladding layer 18' each formed of BPSG having a relatively large coefficient of thermal expansion. That is, the coefficient of thermal expansion of BPSG is $34 \times 10^{-7}$/K, and the coefficient of thermal expansion of silica is $5 \times 10^{-7}$/K. Therefore, tensile stresses 48 are generated at the interface between the silica substrate 12' and the lower cladding layer 14' of BPSG. Accordingly, tensile stresses 50 are applied to the core 16. To cancel or relax the tensile stresses 50, each groove 20 is filled with PSG 41 in this preferred embodiment.

The coefficient of thermal expansion of the PSG 41 is $20 \times 10^{-7}$/K, and the coefficient of thermal expansion of BPSG forming the cladding layers 14' and 18' is $34 \times 10^{-7}$/K. Accordingly, expansion forces 52 are applied from the PSG 41 to the side surfaces of the cladding layers 14' and 18'. As a result, compressive stresses 54 are generated in the cladding layers 14' and 18' to thereby cancel or suppress the tensile stresses 50 generated in the cladding layers 14' and 18' according to the difference in coefficient of thermal expansion between the silica substrate 12' and each of the cladding layers 14' and 18'.

Figure 10:
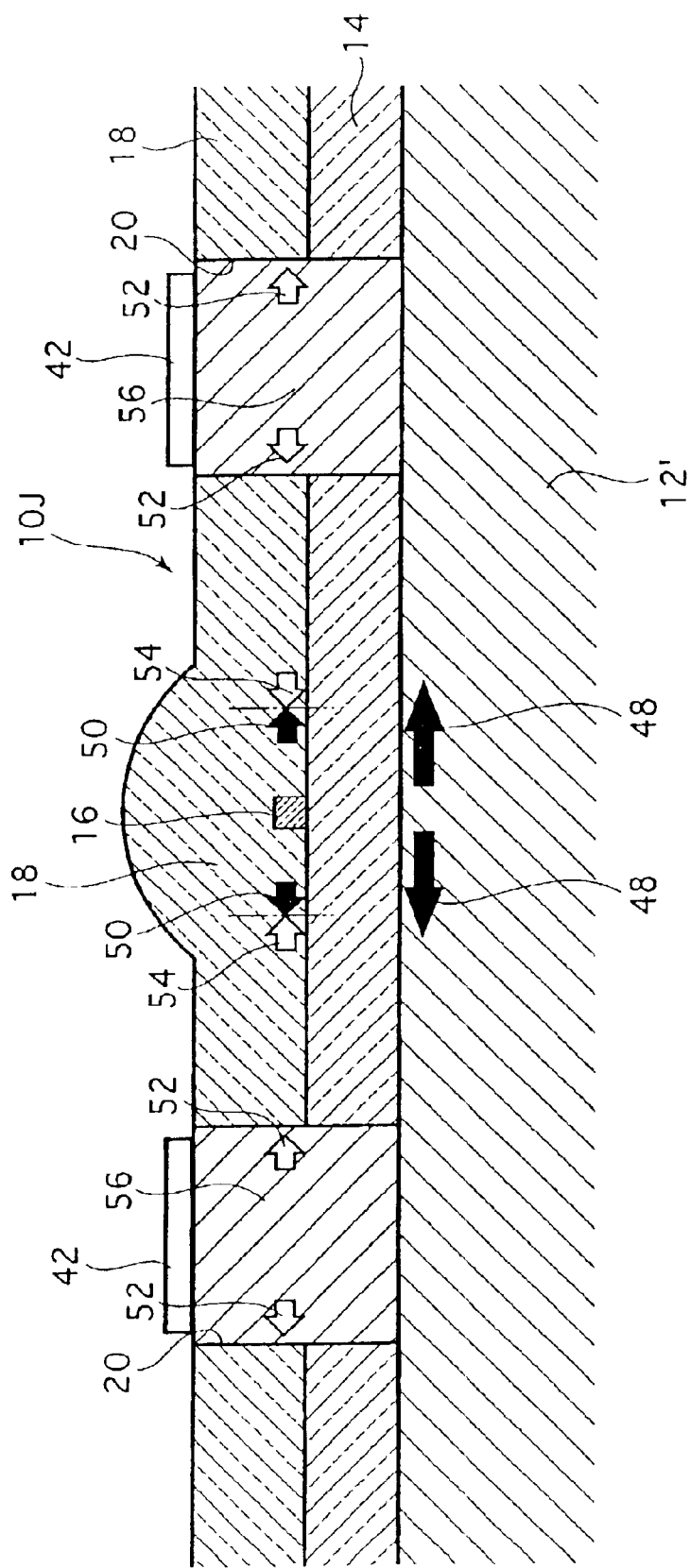
FIG. 10 is a sectional view of a planar optical waveguide device according to a tenth preferred embodiment of the present invention.

Referring to FIG. 10, there is shown a planar optical waveguide device 10J according to a tenth preferred embodiment of the present invention. In this preferred embodiment, each groove 20 is filled with a thermal expansion material 56, and a temperature controller 42 such as a heater or Peltier element is mounted on the upper surface of each thermal expansion material 56. Each thermal expansion material 56 may be provided by metal such as aluminum (Al), copper (Cu), or gold (Au). The cladding layers 14 and 18 are formed of PSG. Alternatively, the cladding layers 14 and 18 may be formed of BPSG, and the thermal expansion material 56 may be provided by PSG smaller in coefficient of thermal expansion than BPSG forming the cladding layers 14 and 18.

The thermal expansion material 56 is heated to be expanded by the temperature controller 42 such as a heater, thereby applying expansion forces 52 to the side surfaces of the cladding layers 14 and 18. As a result, compressive stresses 54 are generated in the cladding layers 14 and 18 to thereby cancel the tensile stresses 50 generated in the cladding layers 14 and 18 according to the difference in coefficient of thermal expansion between the silica substrate 12' and each of the cladding layers 14 and 18.

In modification, the piezoelectric material 44 shown in FIG. 8 may be used in place of the thermal expansion material 56 to cancel the tensile stresses generated in the cladding layers 14 and 18. In this case, the direction of application of the voltage between the electrodes 46 is reversed to that in the preferred embodiment shown in FIG. 8 to thereby laterally expand the piezoelectric material 44. Accordingly, expansion forces can be applied to the side surfaces of the cladding layers 14 and 18 to thereby generate the compressive stresses 54 in the cladding layers 14 and 18 for canceling the tensile stresses 50 generated in the cladding layers 14 and 18 according to the difference in coefficient of thermal expansion between the silica substrate 12' and each of the cladding layers 14 and 18.

While the lower cladding layer and the upper cladding layer have the same coefficient of thermal expansion in each of the above preferred embodiments, these cladding layers may have different coefficients of thermal expansion provided that stresses are applied between the upper cladding layer and the substrate or between the lower cladding layer and the substrate. In each case, an effect similar to that in each preferred embodiment mentioned above can be exhibited.

According to the present invention as described above, the stresses applied to the core of the optical waveguide can be canceled or reduced. As a result, the polarization dependence of the planar optical waveguide device can be canceled or reduced. According to some of the preferred embodiments mentioned above, the polarization dependence of the planar optical waveguide device can be desirably controlled by controlling the stresses applied to the core.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A planar optical waveguide device comprising:
   a substrate having a first coefficient of thermal expansion;
   a lower cladding layer formed on said substrate, said lower cladding layer having a second coefficient of thermal expansion smaller than said first coefficient of thermal expansion;
   a core formed on said lower cladding layer;
   an upper cladding layer formed on said lower cladding layer so as to cover said core, said upper cladding layer having said second coefficient of thermal expansion;
   a plurality of grooves formed in said upper and lower cladding layers on the opposite sides of said core so as to extend along said core; and
   a contraction material filling each of said plurality of grooves and fixed to said upper and lower cladding layers.

2. A planar optical waveguide device according to claim 1, wherein said contraction material comprises a thermosetting resin.

3. A planar optical waveguide device according to claim 1, wherein said contraction material comprises a UV setting resin.

4. A planar optical waveguide device according to claim 1, wherein said substrate is formed of silicon, and said upper and lower cladding layers are formed of phosphorus-doped silica glass.

5. A planar optical waveguide device according to claim 1, wherein said contraction material is fixed to the side surfaces of said upper and lower cladding layers and the upper surface of said upper cladding layer.

6. A planar optical waveguide device according to claim 5, wherein each of said grooves comprises a first groove formed in said upper cladding layer and a plurality of second grooves formed inside said first groove so as to project into said lower cladding layer;
   said first and second grooves being filled with said contraction material.

7. A planar optical waveguide device according to claim 1, further comprising a temperature controller mounted on said contraction material.

8. A planar optical waveguide device according to claim 7, wherein said temperature controller comprises a heater.

9. A planar optical waveguide device according to claim 7, wherein said temperature controller comprises a Peltier element.

10. A planar optical waveguide device comprising:
    a substrate having a first coefficient of thermal expansion;
    a lower cladding layer formed on said substrate, said lower cladding layer having a second coefficient of thermal expansion smaller than said first coefficient of thermal expansion;
    a core formed on said lower cladding layer;
    a plurality of dummy cores formed on said lower cladding layer on the opposite sides of said core;
    an upper cladding layer formed on said lower cladding layer so as to cover said core and said dummy cores, said upper cladding layer having said second coefficient of thermal expansion, said upper cladding layer having a plurality of projections respectively corresponding to said core and said dummy cores; and
    a contraction material fixed to said upper cladding layer so as to cover a part of said projections corresponding to said dummy cores on each side of said core.

11. A planar optical waveguide device according to claim 10, wherein said contraction material comprises a thermosetting resin.

12. A planar optical waveguide device according to claim 10, wherein said contraction material comprises a UV setting resin.

13. A planar optical waveguide device comprising:
    a substrate having a first coefficient of thermal expansion;
    a lower cladding layer formed on said substrate, said lower cladding layer having a second coefficient of thermal expansion smaller than said first coefficient of thermal expansion;
    a core formed on said lower cladding layer;
    an upper cladding layer formed on said lower cladding layer so as to cover said core, said upper cladding layer having said second coefficient of thermal expansion;
    a plurality of grooves formed in said upper and lower cladding layers on the opposite sides of said core so as to extend along said core;
    a piezoelectric material filling each of said plurality of grooves and fixed to said upper and lower cladding layers; and
    means for applying a voltage to said piezoelectric material.

14. A planar optical waveguide device comprising:
    a substrate having a first coefficient of thermal expansion;
    a lower cladding layer formed on said substrate, said lower cladding layer having a second coefficient of thermal expansion larger than said first coefficient of thermal expansion;
    a core formed on said lower cladding layer;

an upper cladding layer formed on said lower cladding layer so as to cover said core, said upper cladding layer having said second coefficient of thermal expansion;

a plurality of grooves formed in said upper and lower cladding layers on the opposite sides of said core so as to extend along said core;

a thermal expansion material filling each of said plurality of grooves; and a temperature controller mounted on said thermal expansion material.

15. A planar optical waveguide device comprising:

a substrate having a first coefficient of thermal expansion;

a lower cladding layer formed on said substrate, said lower cladding layer having a second coefficient of thermal expansion larger than said first coefficient of thermal expansion;

a core formed on said lower cladding layer;

an upper cladding layer formed on said lower cladding layer so as to cover said core, said upper cladding layer having said second coefficient of thermal expansion;

a plurality of grooves formed in said upper and lower cladding layers on the opposite sides of said core so as to extend along said core; and a thermal expansion material filling each of said plurality of grooves, said thermal expansion material having a third coefficient of thermal expansion smaller than said second coefficient of thermal expansion.

16. A planar optical waveguide device comprising:

a substrate having a first coefficient of thermal expansion;

a lower cladding layer formed on said substrate, said lower cladding layer having a second coefficient of thermal expansion larger than said first coefficient of thermal expansion;

a core formed on said lower cladding layer;

an upper cladding layer formed on said lower cladding layer so as to cover said core, said upper cladding layer having said second coefficient of thermal expansion;

a plurality of grooves formed in said upper and lower cladding layers on the opposite sides of said core so as to extend along said core;

a piezoelectric material filling each of said plurality of grooves; and means for applying a voltage to said piezoelectric material.

* * * * *